United States Patent
Takada et al.

(10) Patent No.: US 7,482,095 B2
(45) Date of Patent: Jan. 27, 2009

(54) ANODE AND BATTERY USING THE SAME

(75) Inventors: Tomoo Takada, Kanagawa (JP); Kenichi Kawase, Fukushima (JP); Isamu Konishiikee, Kanagawa (JP); Yukiko Iijima, Fukushima (JP); Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 648 days.

(21) Appl. No.: 10/845,683

(22) Filed: May 14, 2004

(65) Prior Publication Data

US 2004/0265698 A1 Dec. 30, 2004

(30) Foreign Application Priority Data

May 20, 2003 (JP) ............... P2003-141901

(51) Int. Cl.
*H01M 4/02* (2006.01)
*H01M 4/04* (2006.01)
*H01M 4/58* (2006.01)
*H01M 10/40* (2006.01)

(52) U.S. Cl. .................. 429/218.1; 429/245
(58) Field of Classification Search ............ 429/233, 429/231.1
See application file for complete search history.

(56) References Cited

U.S. PATENT DOCUMENTS

| 6,025,094 | A | 2/2000 | Visco et al. | |
|---|---|---|---|---|
| 2002/0015894 | A1* | 2/2002 | Wariishi et al. | ............ 429/314 |
| 2002/0015897 | A1 | 2/2002 | Koji et al. | |
| 2002/0034687 | A1* | 3/2002 | Tamura et al. | ......... 429/231.95 |
| 2002/0102348 | A1* | 8/2002 | Yagi et al. | .................... 427/58 |
| 2002/0168572 | A1 | 11/2002 | Noriyuki et al. | |
| 2003/0039887 | A1 | 2/2003 | Kyung-Suk et al. | |
| 2003/0088971 | A1 | 5/2003 | Visco et al. | |
| 2003/0180619 | A1* | 9/2003 | Tamura et al. | ......... 429/231.95 |

FOREIGN PATENT DOCUMENTS

| JP | 59226472 A | 12/1984 |
|---|---|---|
| JP | 08-050922 | 2/1996 |
| JP | 11-135115 | 5/1999 |
| JP | 11-339777 | 12/1999 |

OTHER PUBLICATIONS

Linden, "Handbook of Batteries", 2nd Ed., McGraw-Hill, Inc., 1995, pp. 36.28-36.75.*
Tamura et al., "Study on the anode behavior of Sn and Sn-Cu alloy thin-film electrodes", Journal of Power Sources, vol. 107, Issue 1, Apr. 20, 2002, pp. 48-55.*
European search report corresponding to Patent Application No. EP 04 01 1313 issued on Mar. 21, 2007.

* cited by examiner

*Primary Examiner*—Gregg Cantelmo
(74) *Attorney, Agent, or Firm*—Bell, Boyd & Lloyd LLP

(57) ABSTRACT

An anode, and a battery using the anode is provided. The anode has a structure in which an anode current collector, an anode active material layer and a protective layer are laminated in this order. The anode active material layer includes Sn, and is alloyed with the anode current collector in at least a portion of an interface with the anode current collector. The protective layer include an element constituting a simple substance with a higher melting point than Sn such as C, Si or W, and not forming a compound with Sn. Thereby, even if the anode wound into a roll is subjected to heat treatment, fusion bonding between adjacent anodes can be prevented.

18 Claims, 3 Drawing Sheets

ANODE AND BATTERY USING THE SAME

CROSS REFERENCES TO RELATED APPLICATIONS

This application claims priority to Japanese Patent Application No. P2003-141901, filed in Japan on May 20, 2003, the disclosure of which is incorporated by reference herein.

BACKGROUND OF THE INVENTION

The present invention relates to an anode including an anode current collector and an anode active material layer, and a battery using the anode.

In recent years, as mobile devices have higher performance and more functions, higher capacities of secondary batteries as power sources of the mobile devices have been desired. As a secondary battery which meets the requirement, a lithium secondary battery is utilized. However, the battery capacity of a currently typical lithium secondary battery which uses lithium cobalt oxide as a cathode and graphite as an anode has reached a point of saturation, so it is extremely difficult to substantially increase the capacity of the lithium secondary battery. Although an anode using metal lithium (Li) has been studied since a long time ago, in order to put the anode to practical use, it is required to improve precipitation/dissolution efficiency and control dendritic precipitation.

On the other hand, an anode with a high capacity which uses silicon (Si), tin (Sn) or the like has been actively studied recently. However, when charge and discharge are repeated, the anode is broken into small pieces due to severe expansion and shrinkage of an anode active material of the anode, thereby a current collecting property declines, or the decomposition of an electrolyte solution is accelerated due to an increase in a surface area, thereby cycle characteristics are extremely poor. Therefore, an anode in which an anode active material layer is formed on an anode current collector through a vapor-phase deposition method, a liquid-phase deposition method or a sintering method (for example, refer to Japanese Unexamined Patent Application Publication No. Hei 8-50922, Japanese Patent No. 2948205, and Japanese Unexamined Patent Application Publication No. Hei 11-135115) has been studied. Compared to a conventional coating type anode to which slurry including a particulate anode active material, a binder and the like is applied, the anode can be prevented from being broken into small pieces, and the anode current collector and the anode active material layer can be formed as one unit, so the electronic conductivity in the anode is extremely superior. Therefore, higher performance in terms of capacity and cycle lifespan is expected. Moreover, an electronic conductor, a binder and gaps which are present in a conventional anode can be reduced or eliminated, so the anode can be essentially formed into a thin film.

In the integral type anode, in the case where the anode active material layer includes tin, for example, heat treatment is preferably performed to accelerate alloying between the anode current collector and the anode active material layer in at least a portion of an interface between the anode current collector and the anode active material layer. Generally, the heat treatment is performed after an anode in which an anode active material layer is formed on a strip-shaped anode current collector is wound into a roll.

However, in this case, the anode active material layers formed on both sides of the anode current collector face and come into contact with each other, so the anode active material layers may be fusion bonded by the heat treatment. Therefore, a fracture in the anode may occur in a process of unfolding the anode wound into a roll and laminating the anode on a cathode, or cycle characteristics may be degraded due to unevenness in the thickness of the anode active material layer.

SUMMARY OF THE INVENTION

The present invention relates to an anode including an anode current collector and an anode active material layer, and a battery using the anode. The invention provides an anode having superior productivity and superior cycle characteristics, and a battery using the anode.

An anode according to an embodiment the present invention includes an anode current collector; an anode active material layer being disposed on the anode current collector, being alloyed with the anode current collector in at least a portion of an interface with the anode current collector, and including tin; and a protective layer being disposed on the anode active material layer on a side opposite to the anode current collector, and including an element of a simple substance with a higher melting point than tin.

A battery according to an embodiment of the present invention includes a cathode; an anode; and an electrolyte, wherein the anode comprises: an anode current collector; an anode active material layer being disposed on the anode current collector, being alloyed with the anode current collector in at least a portion of an interface with the anode current collector, and including tin; and a protective layer being disposed on the anode active material layer on a side opposite to the anode current collector, and including an element of a simple substance with a higher melting point than tin.

In an embodiment, the protective layer includes an element of a simple substance with a higher melting point than tin that is disposed on the anode active material layer on a side opposite to the anode current collector, so even if the anode wound into a roll is subjected to heat treatment, fusion bonding between adjacent anodes can be prevented. Therefore, unevenness in the thickness of the anode active material layer and a fracture in the anode active material layer can be prevented.

In a battery the anode according to an embodiment is used, so superior cycle characteristics can be obtained.

Additional features and advantages of the present invention are described in, and will be apparent from, the following Detailed Description of the Invention and the figures.

DETAILED DESCRIPTION OF THE INVENTION

The present invention relates to an anode including an anode current collector and an anode active material layer, and a battery using the anode.

A preferred embodiment of the present invention will be described in more detail below referring to the accompanying drawings.

Figure 1:
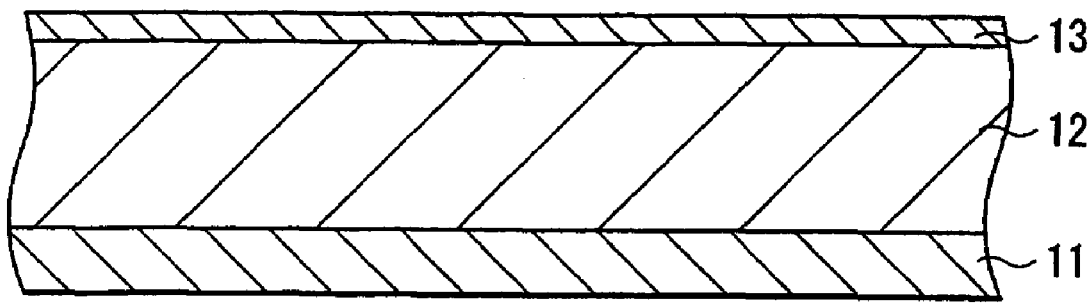
FIG. 1 is a sectional view of an anode according to an embodiment of the present invention.

FIG. 1 shows a schematic structure of an anode according to an embodiment of the present invention. The anode includes, for example, an anode current collector 11, an anode active material layer 12 and a protective layer 13. The anode active material layer 12 is disposed on the anode current collector 11, and the protective layer 13 is disposed on the anode active material layer 12 on a side opposite to the anode current collector 11.

The anode current collector 11 preferably includes, for example, one type of material or two or more types of material, such as copper (Cu), nickel (Ni), cobalt (Co), manganese (Mn), titanium (Ti), molybdenum (Mo), tungsten (W), aluminum (Al), stainless and combinations thereof. In an embodiment, the anode current collector 11 more preferably includes a metal which is easily alloyed with the anode active material layer 12 among them. In the embodiment, as will be described later, the anode active material layer 12 includes tin, so materials suitable for the anode current collector 11 include copper, nickel, cobalt, manganese, titanium, stainless and the like. The anode current collector 11 may include a single layer or a plurality of layers. In the case where the anode current collector 11 includes a plurality of layers, a layer in contact with the anode active material layer 12 includes a metal material in an embodiment which is easily alloyed with the anode active material layer 12, and other layers may be made of any other suitable metal materials.

The anode active material layer 12 includes tin, and tin may be included as a simple substance, a compound thereof or an alloy thereof. Tin, a tin compound or a tin alloy functions as an anode active material. As the tin compound or the tin alloy, for example, an alloy including tin and an element in Groups 4 through 11 of the long form of the periodic table of the elements can be used in an embodiment. In addition, $Mg_2Sn$, $SnO_w(0<w\leq2)$, $SnSiO_3$, $LiSnO$ and the like can be used, for example.

The anode active material layer 12 is alloyed with the anode current collector 11 in at least a portion of an interface with the anode current collector 11. More specifically, in the interface, an element of the anode current collector 11 is diffused into the anode active material layer 12, or an element of the anode active material is diffused into the anode current collector 11, or they are diffused into each other. In the description, the above-described diffusion of the elements is considered as a mode of alloying.

The anode active material layer 12 is preferably formed through at least one method, such as a vapor-phase deposition method, a liquid-phase deposition method, a sintering method and the like. It is because a fracture in the anode active material layer 12 due to expansion and shrinkage thereof according to charge and discharge can be prevented, and the anode current collector 11 and the anode active material layer 12 can be formed as one unit, and the electronic conductivity in the anode can be improved. Moreover, it is because in contrast to a conventional coating type anode, a binder and gaps can be reduced or eliminated, and the anode can be formed into a thin film.

The protective layer 13 includes one type or two or more types of materials, such as simple substances having a higher melting point than tin (hereinafter referred to as elements with a higher melting point than tin). The elements with a higher melting point than tin can include a simple substance, a compound thereof or an alloy thereof. Thereby, the melting point of the protective layer 13 becomes higher, so, for example, as will be described later, even if heat treatment is performed after a strip-shaped anode is wound into a roll, fusion bonding between adjacent anodes, more specifically fusion bonding between anode active material layers 12 or between the anode current collector 11 and the anode active material layer 12 can be prevented.

The protective layer 13 can be formed in an embodiment on at least a portion of a surface of the anode active material layer 12, so the protective layer 13 is not necessarily formed all over the surface of the anode active material layer 12. For example, the protective layer 13 can be scattered on the anode active material layer 12 like islands, or may have apertures for exposing the anode active material layer 12. Moreover, the protective layer 13 can be alloyed with the anode active material layer 12 in at least a portion of an interface with the anode active material layer 12. In other words, in the interface, an element of the protective layer 13 can be diffused into the anode active material layer 12, or an element of the anode active material can be diffused into the protective layer 13, or they can be diffused into each other according to various embodiments.

The content of the element with a higher melting point than tin in the protective layer 13 is larger than that in a region of the anode active material layer 12 on a side closer to the protective layer 13. It is because the protective layer 13 has a higher melting point than the region of the anode active material layer 12 on a side closer to the protective layer 13 so as to prevent fusion bonding between the anodes. Moreover, the content of the element with a higher melting point than tin in the protective layer 13 can be uniform or vary in the protective layer 13; however, in the case where the content varies, the content is preferably larger on a side opposite to the anode active material layer 12 than on a side closer to the anode active material layer 12. It is because fusion bonding between the anodes can be more effectively prevented.

As the element with a higher melting point than tin, an element which does not form a compound with tin is preferable, and more specifically, carbon (C), silicon, tungsten or the like is preferable. It is because diffusion into the anode active material layer 12 can be reduced, and the protective layer 13 can have a higher melting point.

The protective layer 13 is preferably formed through at least one method, such as a vapor-phase deposition method, a liquid-phase deposition method and a sintering method, because the protective layer 13 can be formed into a thin film. The protective layer 13 may be formed through a coating method, and include a binder in addition to one type of material or two or more types of materials such as simple substances, compounds thereof and alloys thereof of the elements with a higher melting point than tin. As the binder, a material with a melting point higher than a heat treatment temperature is preferable in order to prevent fusion bonding between binders during heat treatment, and a combination of the material with a melting point higher than the heat treatment temperature and a conventionally used binder such as polyvinylidene fluoride and the like be used.

The protective layer 13 preferably has a thickness of about 10 nm or more, and in the case where the protective layer 13 includes an element capable of electrochemically inserting and extracting lithium as the element with a higher melting point than tin, the protective layer 13 more preferably has a thickness of about 0.1 μm or more to obtain a sufficient effect. Moreover, from the viewpoint of maintaining a higher capacity and superior cycle characteristics of the anode, the protective layer 13 preferably has a thickness of about 2 μm or less. In the case where the protective layer 13 is alloyed with the anode active material layer 12, the thickness of the protective layer 13 means a thickness of the protective layer 13 except for a portion thereof alloyed with the anode active material layer 12.

The anode can be manufactured through the following steps, for example.

At first, for example, the strip-shaped anode current collector 11 is prepared, and the anode active material layer 12 is formed on the anode current collector 11. The anode active material layer 12 can be formed through depositing an anode active material on the anode current collector 11 by a vapor-phase deposition method or a liquid-phase deposition method, or through a sintering method in which after a layer including a particulate anode active material is formed on the anode current collector 11, the layer is sintered, or through a combination of two or three methods such as a vapor-phase deposition method, a liquid-phase deposition method and a sintering method according to various embodiments.

Next, the protective layer 13 is formed on the anode active material layer 12. As in the case of the anode active material layer 12, the protective layer 13 can be formed through depositing one type of material or more types of material such as simple substances, compounds thereof and alloys thereof of elements with a higher melting point than tin on the anode active material layer 12 by a vapor-phase deposition method or a liquid-phase deposition method, or through a sintering method in which after one kind or two or more kinds, such as simple substances, compounds thereof and alloys thereof of elements with a higher melting point than tin is formed on the anode active material layer 12, they are sintered, or through a combination of two or three methods such as a vapor-phase deposition method, a liquid-phase deposition method and a sintering method. Moreover, for example, the protective layer 13 can be formed in an embodiment through a coating method in which the anode active material layer 12 is coated with a mixture including a binder in addition to one type of material or two or more types of materials such as a substances thereof, a compound thereof and an alloy thereof of elements with a higher melting point than tin. At this time, as the binder, a material with a melting point higher than a heat treatment temperature is preferably used in order to prevent fusion bonding between binders during heat treatment which will be described later, and a combination of a material with a melting point higher than the heat treatment temperature and a conventionally used material, such as polyvinylidene fluoride and the like can be used.

As the vapor-deposition method which is used to form the anode active material layer 12 and the protective layer 13, for example, a physical deposition method or a chemical deposition method are used, and more specifically, a vacuum deposition method, a sputtering method, an ion plating method, a laser ablation method, a thermal CVD (chemical vapor deposition) method, a plasma CVD method or the like can be used. As the liquid-phase deposition method, an electrolytic plating method, an electroless plating method or the like can be used. As the sintering method, a known technique such as, for example, an atmosphere sintering method, a reaction sintering method or a hot press sintering method can be used. As the coating method, a known technique such as a spray method, a doctor blade method or a transfer method can be used.

After the protective layer 13 is formed, the anode current collector 11 on which the anode active material layer 12 and the protective layer 13 are formed is wound into a roll, and the anode current collector 11 is subjected to heat treatment, for example, in a vacuum atmosphere, an air atmosphere, a reduction atmosphere, an oxidizing atmosphere or an inert atmosphere. At this time, fusion bonding between adjacent anodes can be prevented by the protective layer 13. Therefore, an anode with less or effectively no unevenness in the thickness and less or effectively no fracture can be obtained. The heat treatment temperature is preferably about 100° C. or more in order to accelerate alloying in at least a portion of the interface between the anode current collector 11 and the anode active material layer 12, and more preferably about 200° C. or more in order to further accelerate alloying. Moreover, in order to prevent deformation and a fracture in the anode current collector 11, the heat treatment temperature is preferably equal to or lower than the melting point of the anode current collector 11, and more preferably about 300° C. or less in order to prevent a side reaction except for alloying at which the heat treatment is aimed. For example, when the anode current collector 11 is made of electrolytic copper foil, the heat treatment temperature is preferably within a range of about 100° C. to about 1083° C. inclusive, and more preferably within a range of about 200° C. to about 300° C. inclusive. The anode according to the embodiment is completed through the above steps.

The anode is used in a secondary battery as follows, for example.

Figure 2:
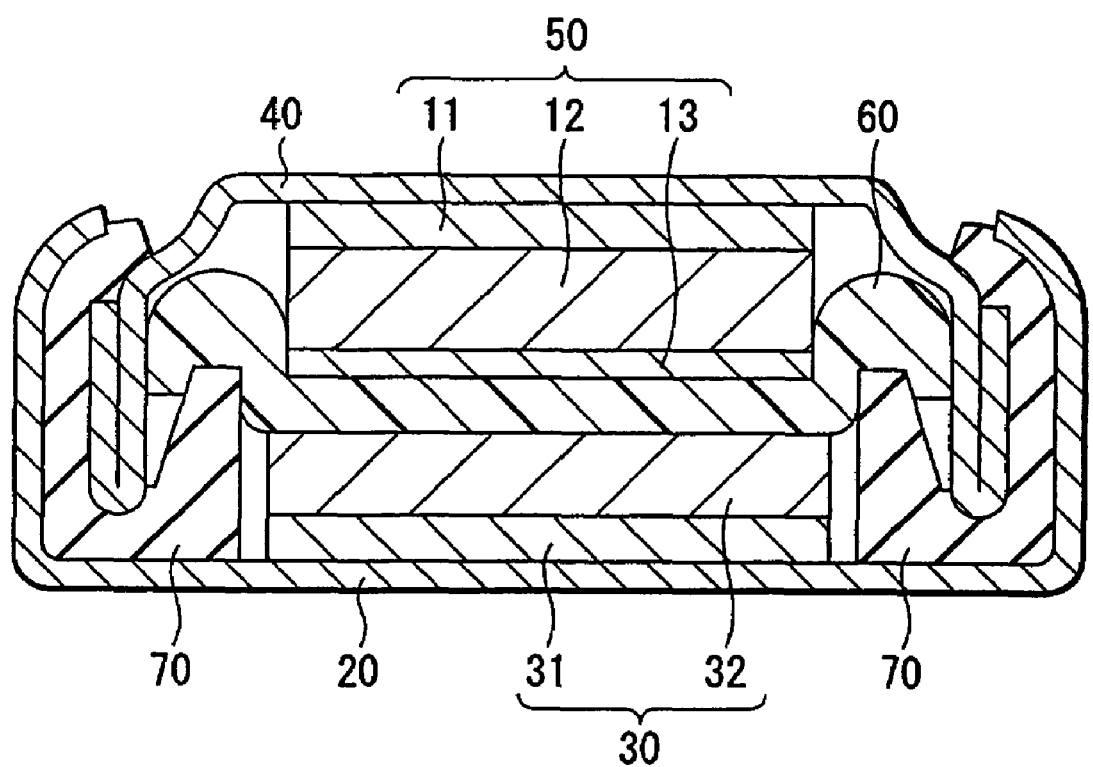
FIG. 2 is a sectional view of a secondary battery using the anode shown in FIG. 1.

FIG. 2 shows the structure of the secondary battery. The secondary battery is a so-called coin type, and a disk-shaped cathode 30 contained in a package can 20 and a disk-shaped anode 50 according to the embodiment contained in a package cup 40 are laminated with a separator 60 in between to form the secondary battery. Edge portions of the package can 20 and the package cup 40 are caulked with an insulating gasket 70 to seal them. The package can 20 and the package cup 40 are made of, for example, metal such as stainless or aluminum (Al).

The cathode 30 includes, for example, a cathode current collector 31 and a cathode active material layer 32 disposed on the cathode current collector 31, and the cathode active material layer 32 is disposed so as to face the protective layer 13. The cathode current collector 31 is made of, for example, aluminum, nickel, stainless and the like.

The cathode active material layer 32 includes, for example, one type of material or two or more types of cathode materials capable of inserting and extracting lithium as the cathode active material, and can include an electronic conductor such as a carbon material and a binder such as polyvinylidene fluoride if necessary. As the cathode material capable of inserting and extracting lithium, for example, lithium-containing metal complex oxide represented by a general formula $Li_xMIO_2$ is preferable, because when the cathode active material layer 32 includes the lithium-containing metal complex oxide, a higher capacity can be achieved. In the general formula, MI represents one or more kinds of transition metals, and, for example, at least one kind such as cobalt, nickel, manganese and the like is preferable as MI. The value of x depends upon a charge-discharge state of the battery, and is generally within a range of $0.05 \leq x \leq 1.10$. Specific examples of such a lithium-containing metal complex oxide include $LiCoO_2$, $LiNiO_2$ and the like.

Moreover, for example, the cathode 30 can be formed through forming the cathode active material layer 32 on the cathode current collector 31 by a coating method in which the cathode current collector 31 is coated with a mixture including a binder in addition to the cathode active material.

The separator 60 is provided to isolate the cathode 30 from the anode 50 to prevent a short circuit of current due to a contact between the cathode 30 and the anode 50, and passes lithium ions therethrough. The separator 60 is made of, for example, polyethylene or polypropylene.

The separator 60 is impregnated with an electrolyte solution which is a liquid electrolyte. The electrolyte solution includes, for example, a solvent and a lithium salt as an electrolyte salt dissolved in the solvent, and may include various additives if necessary. The electrolyte solution is preferably used, because high ion conductivity can be obtained. Examples of the solvent include organic solvents such as ethylene carbonate, propylene carbonate, dimethyl carbonate, diethyl carbonate and ethyl methyl carbonate. One kind or a mixture of two or more kinds selected from them can be used.

Examples of the lithium salt include $LiPF_6$, $LiClO_4$ and the like. One kind or a mixture of two or more kinds of lithium salts can be used.

For example, the secondary battery can be manufactured through laminating the cathode 30, the separator 60 which is impregnated with the electrolyte solution, and the anode 50, containing them in the package can 20 and the package cup 40, and caulking the package can 20 and the package cup 40.

When the secondary battery is charged, for example, lithium ions are extracted from the cathode 30, and are inserted into the anode 50 through the electrolyte solution. When the secondary battery is discharged, for example, lithium ions are extracted from the anode 50, and are inserted into the cathode 30 through the electrolyte solution. The anode according to the embodiment is used in the secondary battery, so superior cycle characteristics can be obtained.

The anode according to the embodiment can be used in a secondary battery as follows.

Figure 3:
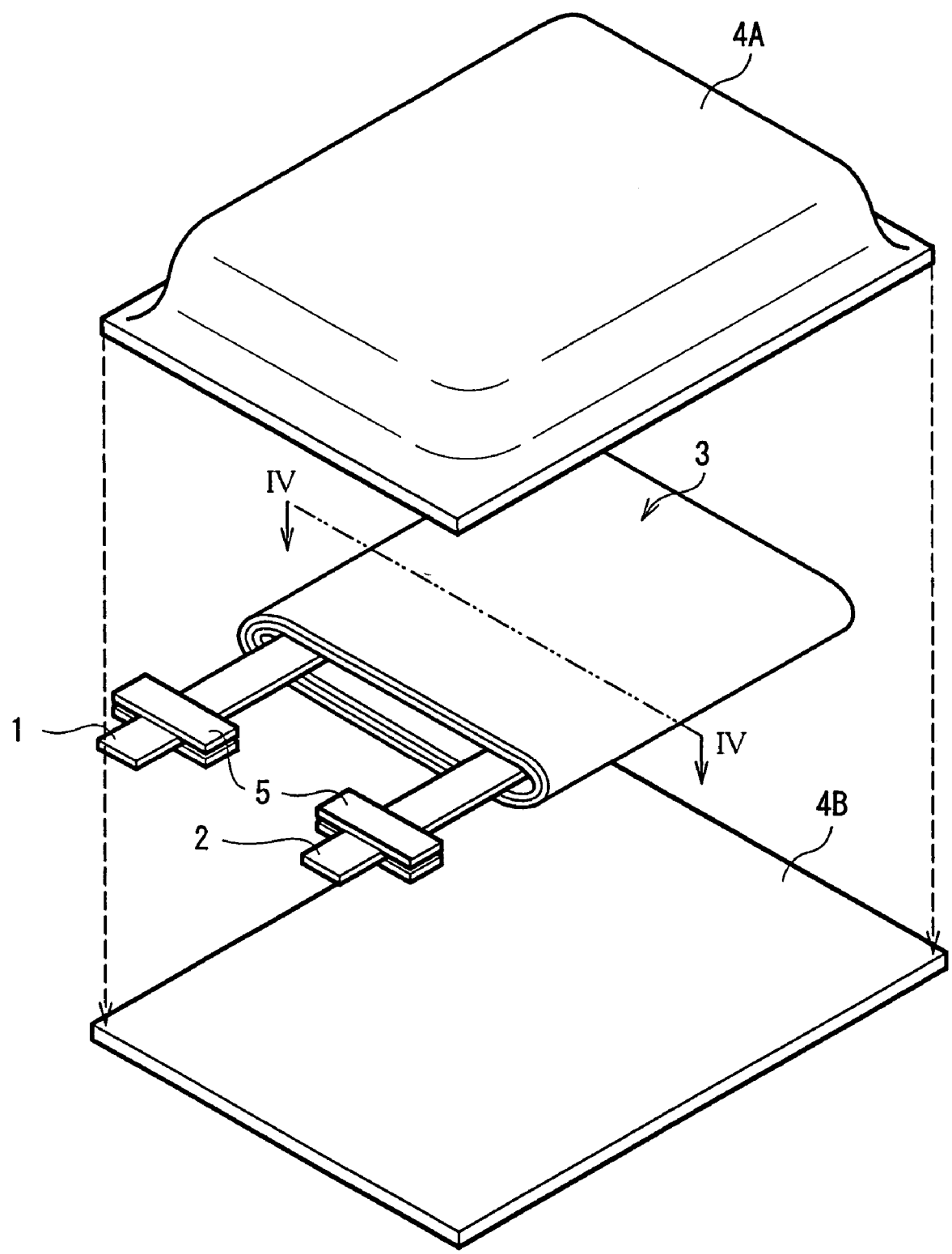
FIG. 3 is a perspective view of another secondary battery using the anode shown in FIG. 1.

FIG. 3 shows the structure of the secondary battery. The secondary battery includes a spirally wound electrode body 3 to which a cathode lead 1 and an anode lead 2 are attached and which is contained in film-shape package members 4A and 4B, thereby the secondary battery can be formed with a smaller size, a lighter weight and a lower profile.

For example, the cathode lead 1 and the anode lead 2 are derived from the interiors of the package members 4A and 4B to outside in the same direction. The cathode lead 1 and the anode lead 2 are made of, for example, a metal material such as aluminum, copper, nickel, stainless and the like in a sheet shape, a mesh shape and other suitable shape.

The package members 4A and 4B are made of, for example, a rectangular aluminum laminate film including a nylon film, aluminum foil and a polyethylene film laminated in this order. The package members 4A and 4B are disposed so that the polyethylene film of each of the package members 4A and 4B faces the spirally wound electrode body 3, and edge portions of the package members 4A and 4B are adhered to each other by fusion bonding or an adhesive. An adhesive film is inserted each between the package member 4A and the cathode lead 1, between the package member 4A and the anode lead 2, between the package member 4B and the cathode lead 1 and between the package member 4B and the anode lead 2 for preventing the entry of outside air. The adhesive film 5 is made of, for example, a material having adhesion to the cathode lead 1 and the anode lead 2, that is, a polyolefin resin such as polyethylene, polypropylene, modified polyethylene or modified polypropylene.

In addition, the package members 4A and 4B can include a laminate film with any other structure, a high molecular weight film such as polypropylene, or a metal film instead of the aluminum laminate film.

Figure 4:
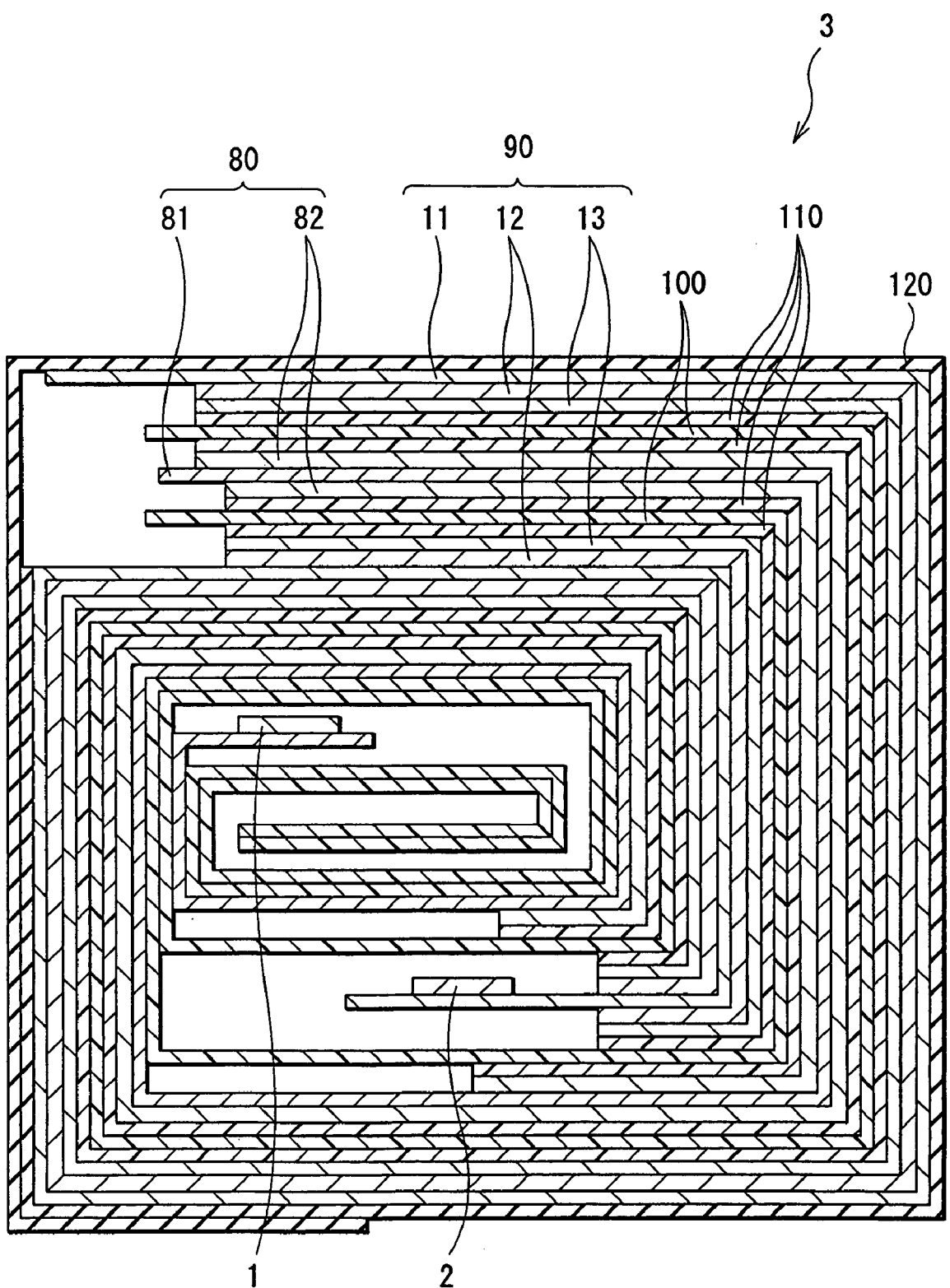
FIG. 4 is a sectional view of a spirally wound electrode body taken along a line IV-IV of FIG. 3.

FIG. 4 shows a sectional view of the spirally wound electrode body 3 taken along a line IV-IV of the FIG. 3. The spirally wound electrode body 3 is a spirally wound laminate including a cathode 80 and an anode 90 according to the embodiment with a separator 100 and an electrolyte layer 110 in between, and an outermost portion of the spirally wound electrode body 3 is protected with a protective tape 120.

The cathode 80 has a structure in which a cathode active material layer 82 is disposed on one side or both sides of a cathode current collector 81. The anode 90 has a structure in which the anode active material layer 12 and the protective layer 13 are disposed on one side or both sides of the anode current collector 11, and the protective layer 13 is disposed so as to face the cathode active material layer 82. The structures of the cathode current collector 81, the cathode active material layer 82 and the separator 100 are the same as those of the above described cathode current collector 31, the above described cathode active material layer 32 and the above described separator 60.

The electrolyte layer 110 is made of a so-called gel electrolyte in which a holding body holds an electrolyte solution. The gel electrolyte is preferable, because the gel electrolyte can obtain high ion conductivity, and can prevent leakage of the battery or expansion due to high temperature. The structure of the electrolyte solution (that is, a solvent and an electrolyte salt) is the same as that in the coin type secondary battery shown in FIG. 2.

The holding body is made of, for example, a high molecular weight material. As the high molecular weight material, for example, polyvinylidene fluoride which is a block copolymer is utilized.

The secondary battery can be manufactured through the following steps, for example.

At first, an electrolyte layer 110 in which a holding body holds an electrolyte solution is formed on each of the cathode 80 and the anode 90. After that, the cathode lead 1 is attached to an end portion of the cathode current collector 81 through welding or the like, and the anode lead 2 is attached to an end portion of the anode current collector 11 through welding or the like.

Next, after the cathode 80 on which the electrolyte layer 110 is formed and the anode 90 on which the electrolyte layer 110 is formed are laminated with the separator 100 in between to form a laminate body, the laminate body was spirally wound in a longitudinal direction, and the protective tape 120 is bonded to an outermost portion of the laminate body so as to form the spirally wound electrode body 3.

Finally, for example, the spirally wound electrode body 3 is sandwiched between the package members 4A and 4B, and edge portions of the package members 4A and 4B are adhered to each other through thermal fusion bonding or the like to seal the spirally wound electrode body 3 in the package members 4A and 4B. At this time, the adhesive film 5 is inserted each between the cathode lead 1 and the package member 4A, between the anode lead 2 and the package member 4A, between the cathode lead 1 and the package member 4B and the anode lead 2 and the package member 4B. Thereby, the secondary battery shown in FIG. 3 is completed.

The functions of the secondary battery are equivalent to the coin-type secondary battery shown in FIG. 2.

Thus, in the embodiment, the protective layer 13 is disposed on the anode active material layer 12 on a side opposite to the anode current collector 11, so even if the anode wound into a roll is subjected to heat treatment, fusion bonding between adjacent anodes can be prevented, and unevenness in the thickness of the anode active material layer 12 and a fracture in the anode active material layer 12 can be prevented. Therefore, superior cycle characteristics can be obtained.

More specifically, when the anode active material layer 12 includes an element with a higher melting point than tin which does not form a compound with tin, that is, at least one type of material such as carbon, silicon, tungsten and the like, a higher effect can be obtained.

The following examples are illustrative of the present invention without limitation.

EXAMPLES 1-1 THROUGH 1-6

At first, copper foil with a surface roughness (arithmetic mean roughness Ra) of 0.3 μm and a thickness of 15 μm was used as the anode current collector 11, and the anode active material layer 12 made of tin with a thickness of 2 μm was formed on a surface of the anode current collector 11 through a resistance heating vacuum deposition method. Next, after the protective layer 13 made of carbon (C) was formed on a surface of the anode active material layer 12 through a sputtering method, the anode current collector 11 was wound into a roll, and was subjected to heat treatment for 10 hours at 250° C. in a vacuum atmosphere. Thereby, anodes of Examples 1-1 through 1-6 were formed. The thickness of the protective layer 13 varied as shown in Table 1.

were piled together, and were subjected to heat treatment for 10 hours at 250° C. in a vacuum to determine whether fusion bonding between the anode active material layers 12 occurred. More specifically, after the heat treatment, one of adjacent anodes was fixed, and the other anode was peeled by approximately 10 mm, and then a peel test in which the other anode was further peeled by 20 mm or over in a perpendicular direction at a speed of 50 mm/min was performed to measure its peel strength. Even if the anode had a slight amount of peel strength, the anode was considered "bonded", and the anode having no peel strength was considered "not bonded". The results are shown in Table 1.

Moreover, coin-type secondary batteries with a diameter of 20 mm and a thickness of 1.6 mm shown in FIG. 2 were formed by using the anodes of Examples 1-1 through 1-6 and Comparative Example 1-1. At that time, the cathode 30 was formed as follows. At first, lithium cobalt oxide ($LiCoO_2$) powder with an average diameter of 5 μm, carbon black and polyvinylidene fluoride were mixed at a mass ratio of 92:3:5, and the mixture was put into N-methyl pyrrolidone to form slurry. After the slurry was applied to the cathode current collector 31 made of aluminum with a thickness of 20 μm, and was dried, the slurry was pressed to form the cathode active material layer 32, thereby the cathode 30 was formed. As the electrolyte, a mixed solvent including 40% by mass of ethyl-

TABLE 1

| | ANODE ACTIVE MATERIAL LAYER | | | PROTECTIVE LAYER | | | HEAT TREATMENT CONDITIONS | FUSION BONDING BETWEEN ANODES | CAPATICY RETENTION RATIO |
|---|---|---|---|---|---|---|---|---|---|
| | ELEMENT | THICKNESS | FORMING METHOD | ELEMENT | THICKNESS | FORMING METHOD | | | |
| EXAMPLE 1-1 | Sn | 2 μm | VACUUM DEPOSITION | C | 3 nm | SPUTTERING | 250° C.-10 hr | BONDED | 17% |
| EXAMPLE 1-2 | Sn | 2 μm | VACUUM DEPOSITION | C | 10 nm | SPUTTERING | 250° C.-10 hr | NOT BONDED | 46% |
| EXAMPLE 1-3 | Sn | 2 μm | VACUUM DEPOSITION | C | 0.1 μm | SPUTTERING | 250° C.-10 hr | NOT BONDED | 77% |
| EXAMPLE 1-4 | Sn | 2 μm | VACUUM DEPOSITION | C | 1 μm | SPUTTERING | 250° C.-10 hr | NOT BONDED | 83% |
| EXAMPLE 1-5 | Sn | 2 μm | VACUUM DEPOSITION | C | 2 μm | SPUTTERING | 250° C.-10 hr | NOT BONDED | 80% |
| EXAMPLE 1-6 | Sn | 2 μm | VACUUM DEPOSITION | C | 3 μm | SPUTTERING | 250° C.-10 hr | NOT BONDED | 76% |
| COMPARATIVE EXAMPLE 1-1 | Sn | 2 μm | VACUUM DEPOSITION | ☐ | ☐ | ☐ | 250° C.-10 hr | BONDED | 13% |

Moreover, as Comparative Example 1-1 relative to Examples 1-1 through 1-6, an anode was formed as in the case of Examples 1-1 through 1-6, except that the protective layer was not formed. When the anodes of Examples 1-1 through 1-6 and Comparative Example 1-1 were analyzed by XPS (X-ray Photoelectron Spectroscopy), AES (Auger Electron Spectroscopy), an EDX (Energy Dispersive X-Ray Spectroscope), a TEM (Transmission Electron Microscope) and XRD (X-Ray Diffraction), it was confirmed that the anode active material layer 12 was alloyed with the anode current collector 11 in at least a portion of an interface with the anode current collector 11. Moreover, the plate-shaped anodes of Examples 1-1 through 1-6 and Comparative Example 1-1 ene carbonate and 60% by mass of dimethyl carbonate in which $LiPF_6$ was dissolved so as to have a concentration of 1.0 mol/$dm^3$ was used. As the separator 60, a microporous film made of polypropylene with a thickness of 25 μm was used.

The secondary batteries of Examples 1-1 through 1-6 and Comparative Example 1-1 were subjected to a charge-discharge cycle in which the secondary batteries were subjected to a constant-current constant-voltage charge at an upper limit voltage of 4.2 V and a current density of 1 mA/$cm^2$, and then they were subjected to a constant-current discharge at a current density of 1 mA/$cm^2$ and a final voltage of 2.5 V. The charge-discharge cycle was repeated to determine a capacity retention ratio after 20 cycles, assuming that the initial discharge capacity was 100%. The results are shown in Table 1.

It was evident from Table 1 that the secondary batteries of Examples 1-1 through 1-6 could have a higher capacity retention ratio than that of Comparative Example 1-1. Specifically, in the Examples 1-2 through 1-6, no fusion bonding between anodes occurred, and the capacity retention ratio could be 45% or over, and specifically in Examples 1-4 and 1-5, the capacity retention ratio could be 80% or over. In other words, it was found out that when the anode active material layer 12 included the protective layer 13 including carbon, fusion bonding between anodes could be prevented, and superior cycle characteristics could be obtained. Moreover, it was found out that the protective layer 13 including carbon preferably had a thickness of 10 nm or over, and more preferably a thickness of 1 µm to 2 µm inclusive.

EXAMPLES 2-1 THROUGH 2-4

Anodes were formed as in the case of Examples 1-1 through 1-6, except that the protective layer 13 was made of silicon (Si) with a thickness shown in Table 2, and secondary batteries were formed by using the anodes. When the anodes of Examples 2-1 through 2-4 were analyzed by the XPS, the AES, the EDX, the TEM and the XRD as in the case of Examples 1-1 through 1-6, it was confirmed that the anode active material layer 12 was alloyed with the anode current collector 11 in at least a portion of the interface with the anode current collector 11. Moreover, as in the case of Examples 1-1 through 1-6, whether fusion bonding occurred in the anodes of Examples 2-1 through 2-4 was determined. Further, a capacity retention ratio after 20 cycles in each of the secondary batteries of Examples 2-1 through 2-4 was determined as in the case of Examples 1-1 through 1-6. The obtained results are shown in Table 2 together with the results of Comparative Example 1-1.

It was evident from Table 2 that in the secondary batteries of Examples 2-1 through 2-4, no fusion bonding between anodes occurred, and compared to Comparative Example 1-1, the capacity retention ratio could be higher, and specifically in Example 2-1, the capacity retention ratio could be 80% or over. In other words, it was found out that when the anode active material layer 12 included the protective layer 13 including silicon, fusion bonding between anodes could be prevented, and superior cycle characteristics could be obtained. Moreover, it was found out that the protective layer 13 including silicon preferably had a thickness of approximately 0.1 µm.

EXAMPLES 3-1 THROUGH 3-4

Anodes were formed as in the case of Examples 1-1 through 1-6, except that the protective layer 13 was made of tungsten with a thickness shown in Table 3, and secondary batteries were formed by using the anodes. When the anodes of Examples 3-1 through 3-4 were analyzed by the XPS, the AES, the EDX, the TEM and the XRD as in the case of Examples 1-1 through 1-6, it was confirmed that the anode active material layer 12 was alloyed with the anode current collector 11 in at least a portion of the interface with the anode current collector 11. Moreover, as in the case of Examples 1-1 through 1-6, whether fusion bonding occurred in the anodes of Examples 3-1 through 3-4 was determined. Further, a capacity retention ratio after 20 cycles in each of the secondary batteries of Examples 3-1 through 3-4 was determined as in the case of Examples 1-1 through 1-6. The obtained results are shown in Table 3 together with the results of Comparative Example 1-1.

TABLE 2

| | ANODE ACTIVE MATERIAL LAYER | | | PROTECTIVE LAYER | | | HEAT | FUSION BONDING | CAPATICY RETEN- |
|---|---|---|---|---|---|---|---|---|---|
| | ELEMENT | NESS | FORMING METHOD | THICK-ELEMENT | THICK-NESS | FORMING METHOD | TREATMENT CONDITIONS | BETWEEN ANODES | TION RATIO |
| EXAMPLE 2-1 | Sn | 2 µm | VACUUM DEPOSITION | Si | 0.1 µm | SPUTTERING | 250° C.-10 hr | NOT BONDED | 81% |
| EXAMPLE 2-2 | Sn | 2 µm | VACUUM DEPOSITION | Si | 1 µm | SPUTTERING | 250° C.-10 hr | NOT BONDED | 78% |
| EXAMPLE 2-3 | Sn | 2 µm | VACUUM DEPOSITION | Si | 2 µm | SPUTTERING | 250° C.-10 hr | NOT BONDED | 72% |
| EXAMPLE 2-4 | Sn | 2 µm | VACUUM DEPOSITION | Si | 3 µm | SPUTTERING | 250° C.-10 hr | NOT BONDED | 61% |
| COMPARATIVE EXAMPLE 1-1 | Sn | 2 µm | VACUUM DEPOSITION | ☐ | ☐ | ☐ | 250° C.-10 hr | BONDED | 13% |

TABLE 3

| | ANODE ACTIVE MATERIAL LAYER | | | PROTECTIVE LAYER | | | HEAT TREATMENT CONDITIONS | FUSION BONDING BETWEEN ANODES | CAPATICY RETENTION RATIO |
|---|---|---|---|---|---|---|---|---|---|
| | ELEMENT | THICKNESS | FORMING METHOD | ELEMENT | THICKNESS | FORMING METHOD | | | |
| EXAMPLE 3-1 | Sn | 2 μm | VACUUM DEPOSITION | W | 10 nm | SPUTTERING | 250° C.-10 hr | NOT BONDED | 80% |
| EXAMPLE 3-2 | Sn | 2 μm | VACUUM DEPOSITION | W | 0.1 μm | SPUTTERING | 250° C.-10 hr | NOT BONDED | 84% |
| EXAMPLE 3-3 | Sn | 2 μm | VACUUM DEPOSITION | W | 1 μm | SPUTTERING | 250° C.-10 hr | NOT BONDED | 66% |
| EXAMPLE 3-4 | Sn | 2 μm | VACUUM DEPOSITION | W | 2 μm | SPUTTERING | 250° C.-10 hr | NOT BONDED | 63% |
| COMPARATIVE EXAMPLE 1-1 | Sn | 2 μm | VACUUM DEPOSITION | ☐ | ☐ | ☐ | 250° C.-10 hr | BONDED | 13% |

It was evident from Table 3 that in Examples 3-1 through 3-4, no fusion bonding between anodes occurred, and compared to Comparative Example 1-1, the capacity retention ratio could be higher, and specifically in Examples 3-1 and 3-2, the capacity retention ratio could be 80% or over. In other words, it was found out that when the anode active material layer 12 included the protective layer 13 including tungsten, fusion bonding between anodes could be prevented, and superior cycle characteristics could be obtained. Moreover, it was found out that the protective layer 13 including tungsten preferably had a thickness of 0.1 μm or less.

Although the present invention is described referring to the embodiment and the examples, the invention is not specifically limited to the above embodiment and the above examples, and can be suitably modified. For example, in the above embodiment and the above examples, the case where the electrolyte solution which is a liquid electrolyte, or the so-called gel electrolyte is used is described; however, any other electrolyte may be used. As the other elecrolyte, a solid electrolyte having ionic conductivity, a mixture of a solid electrolyte and an electrolyte solution, or a mixture of a solid electrolyte and a gel electrolyte is cited.

In the solid electrolyte, for example, a solid high molecular weight electrolyte in which an electrolyte salt is dispersed in a high molecular weight compound having ionic conductivity, or an inorganic solid electrolyte made of ion conducting glass, ionic crystal or the like can be used. As the high molecular weight compound of the solid high molecular weight electrolyte, for example, an ether-based high molecular weight compound such as polyethylene oxide or a cross-link including polyethylene oxide, an ester-based high molecular weight compound such as polymethacrylate, an acrylate-based high molecular weight compound, a mixture thereof, or a copolymer thereof can be used. Further, as the inorganic solid electrolyte, lithium nitride, lithium phosphate or the like can be used.

Moreover, in the above embodiment and the above examples, the anode active material layer 12 is formed on the anode current collector 11; however, any other layer may be formed between the anode current collector and the anode active material layer.

Further, in the above embodiment and the above examples, the coin type secondary battery and the laminate type secondary battery are described; however, the invention is also applicable to secondary batteries with any other structure and any other shape such as a cylindrical shape, a prismatic shape, a button shape, a thin shape, a large shape or a laminate shape.

Moreover, the invention is applicable to not only the secondary batteries but also primary batteries.

As described above, in the anode according to the invention, the protective layer including an element of a simple substance with a higher melting point than tin is disposed on the anode active material layer on a side opposite to the anode current collector, so even if the anode wound into a roll is subjected to heat treatment, fusion bonding between adjacent anodes can be prevented, and unevenness in the thickness of the anode active material layer and a fracture in the anode active material layer can be prevented.

Moreover, in the battery according to an embodiment of the present invention, the anode is used, so superior cycle characteristics can be obtained.

Specifically, the protective layer includes an element constituting a substance with a higher melting point than tin, and not forming a compound with tin, more specifically the protective layer includes at least one type of material such as carbon, silicon, tungsten and the like, a higher effect can be obtained.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An anode, comprising:
    an anode current collector;
    an anode active material layer being disposed on the anode current collector, being alloyed with the anode current collector in at least a portion of an interface with the anode current collector, and including tin; and
    a protective layer being disposed on the anode active material layer on a side opposite to the anode current collector, the protective layer comprising at least one material with a melting point higher than tin that does not form a compound with tin, wherein the material is an element, an alloy of the element, or a simple substance containing the element and the element is selected from the group consisting of carbon, silicon, and tungsten.

2. The anode according to claim 1, wherein the anode active material layer is formed on the anode current collector through at least one method selected from the group consisting of a vapor-phase deposition method, a liquid-phase deposition method and a sintering method.

3. The anode according to claim 1, wherein the anode current collector on which the anode active material layer and the protective layer are formed is wound into a roll.

4. The anode according to claim 1, wherein the element is carbon or silicon.

5. The anode according to claim 1, wherein the element is tungsten.

6. The anode according to claim 1, wherein the element is tungsten, and the anode is heat-treated from 250° C. or more to a temperature of 300° C. or less.

7. The anode according to claim 1, wherein the protective layer has a thickness of about 10 nanometers or more.

8. The anode according to claim 1, wherein the protective layer has a thickness of about 2 micrometers or less.

9. A battery, comprising:
a cathode;
an anode; and
an electrolyte,
wherein the anode comprises:
an anode current collector;
an anode active material layer being disposed on the anode current collector, being alloyed with the anode current collector in at least a portion of an interface with the anode current collector, and including tin; and
a protective layer being disposed on the anode active material layer on a side opposite to the anode current collector, the protective layer comprising at least one material with a melting point higher than tin that does not form a compound with tin, wherein at least one material with a higher melting point than tin is an element, an alloy of the element, or a simple substance containing the element, and the element is selected from the group carbon, silicon, and tungsten.

10. The battery according to claim 9, wherein the anode active material layer is formed on the anode current collector through at least one method selected from the group consisting of a vapor-phase deposition method, a liquid-phase deposition method and a sintering method.

11. The battery according to claim 9, wherein the electrolyte includes a holding body, a solvent and an electrolyte salt.

12. The battery according to claim 9, further comprising: a film-shaped package member containing the cathode, the anode and the electrolyte therein.

13. The battery according to claim 9, wherein the cathode includes a lithium-containing metal complex oxide.

14. The battery according to claim 9, wherein the element is carbon or silicon.

15. The battery according to claim 9, wherein the element is tungsten.

16. The battery according to claim 9, wherein the element is tungsten, and the anode is heat-treated from 250° C. or more to a temperature of 300° C. or less.

17. The battery according to claim 9, wherein the protective layer has a thickness of about 10 nanometers or more.

18. The battery according to claim 9, wherein the protective layer has a thickness of about 2 micrometers or less.

* * * * *